(12) United States Patent
Britton et al.

(10) Patent No.: US 8,328,482 B2
(45) Date of Patent: Dec. 11, 2012

(54) HYDRAULIC FOUNDATION BOLT TENSIONER

(75) Inventors: Gordon Britton, Grand Bend (CA); David Hughes, Grand Bend (CA)

(73) Assignee: Integra Technologies Ltd., Grand Bend (CA)

( * ) Notice: Subject to any disclaimer, the term of this patent is extended or adjusted under 35 U.S.C. 154(b) by 574 days.

(21) Appl. No.: 12/475,983

(22) Filed: Jun. 1, 2009

(65) Prior Publication Data
US 2009/0293418 A1  Dec. 3, 2009

(30) Foreign Application Priority Data
May 30, 2008  (CA) .................................. 2632965

(51) Int. Cl.
F16B 31/00 (2006.01)
F16B 31/04 (2006.01)
F15B 1/00 (2006.01)
F99Z 99/00 (2006.01)

(52) U.S. Cl. ....... 411/14.5; 411/266; 411/433; 411/916; 411/917; 254/29 R

(58) Field of Classification Search ................ 411/14.5, 411/432–434, 916, 917, 265–266; 52/745.21; 254/29 R
See application file for complete search history.

(56) References Cited

U.S. PATENT DOCUMENTS

| | | | |
|---|---|---|---|
| 2,866,370 A * | 12/1958 | Biach ............................ | 81/57.37 |
| 4,378,187 A * | 3/1983 | Fullerton ...................... | 411/267 |
| 4,843,785 A * | 7/1989 | Sero et al. ..................... | 52/160 |
| 4,998,453 A | 3/1991 | Walton et al. | |
| 5,032,048 A * | 7/1991 | Walton et al. ................. | 411/433 |
| 5,468,106 A * | 11/1995 | Percival-Smith ............. | 411/434 |
| 5,527,015 A * | 6/1996 | Percival-Smith ............. | 254/29 A |
| 5,690,458 A * | 11/1997 | Junkers ........................ | 411/432 |
| 5,871,205 A | 2/1999 | Latham | |

(Continued)

FOREIGN PATENT DOCUMENTS

GB  2193549  2/1988

OTHER PUBLICATIONS

Hydratight Aquajack Subsea Bolt Tensioning System Specification Sheets. Undated.

(Continued)

*Primary Examiner* — Victor Batson
*Assistant Examiner* — Tyler Johnson
(74) *Attorney, Agent, or Firm* — Brouillette & Partners; François Cartier; Robert Brouillette

(57) ABSTRACT

A tensioner for tensioning foundation bolts generally used in securing large utility towers is provided. The tensioner generally comprises a hollow outer body through which the foundation bolt can extend. The lower end of the body, which is adapted to abut onto the foundation surface from which the bolt extends, is provided with an opening allowing access to a foundation nut threaded onto the foundation bolt. The upper end of the outer body slidingly receives therein an inner body with which it defines an annular hydraulic piston, the inner body being configured with a seat portion for receiving and engaging a split nut mounted to the foundation bolt. Upon providing hydraulic fluid to the tensioner, the hydraulic piston urges the split nut, engaged to the foundation bolt, upwardly, thereby tensioning the foundation bolt. The load in the bolt is then maintained by threading down the foundation nut until it abuts onto the foundation surface.

19 Claims, 6 Drawing Sheets

U.S. PATENT DOCUMENTS

| | | | |
|---|---|---|---|
| 6,065,737 | A | 5/2000 | Richardson et al. |
| 6,506,007 | B1* | 1/2003 | Kishimoto et al. .......... 411/14.5 |
| 6,712,574 | B1* | 3/2004 | Roopnarine .................. 411/433 |
| 7,140,824 | B2* | 11/2006 | Bucknell ...................... 411/14.5 |
| 7,198,236 | B2* | 4/2007 | Warner ....................... 248/125.8 |
| 7,637,706 | B2* | 12/2009 | Steinbock et al. ............ 411/432 |
| 7,661,336 | B2* | 2/2010 | Hohmann et al. ........... 81/57.38 |
| 7,673,849 | B2* | 3/2010 | Britton et al. ............... 254/29 A |
| 7,997,840 | B2* | 8/2011 | Mynhier et al. ............. 411/14.5 |
| 2004/0165963 | A1* | 8/2004 | Bucknell ...................... 411/14.5 |
| 2005/0186050 | A1* | 8/2005 | Britton et al. ................ 411/434 |
| 2006/0133889 | A1* | 6/2006 | Warner ....................... 403/109.4 |
| 2006/0257227 | A1* | 11/2006 | Britton et al. ................ 411/14.5 |
| 2007/0140809 | A1* | 6/2007 | Warner ........................ 411/14.5 |
| 2007/0166121 | A1* | 7/2007 | Mynhier et al. ............. 411/14.5 |
| 2007/0181861 | A1* | 8/2007 | Britton et al. ................ 254/29 A |
| 2011/0188968 | A1* | 8/2011 | Wu et al. ...................... 411/432 |

OTHER PUBLICATIONS

Boltight Sub Sea Hydraulic Bolt Tensioning Tools Specification Sheets. Oct. 2007.

Technofast HydraJac A3 Modular Tensioning Tool Specification Sheets. Undated.

Technofast HydraJac A4 Subsea Tensioning Tool Specification Sheets. Undated.

* cited by examiner

HYDRAULIC FOUNDATION BOLT TENSIONER

CROSS-REFERENCE TO RELATED APPLICATIONS

The present patent application claims the benefits of priority of Canadian Patent Application No. 2,632,965, entitled "Foundation Bolt Tensioner" and filed at the Canadian Intellectual Property Office on May 30, 2008, the content of which is incorporated herein by reference.

FIELD OF THE INVENTION

The present invention generally relates to the technical field of tensioner devices, apparatuses and systems used for tensioning bolts and/or bolt assemblies.

BACKGROUND OF THE INVENTION

Foundation or anchor bolts (hereinafter "foundation bolts") are conventionally used to secure large structures such as wind turbine or utility towers to their respective foundation. Typically, foundation bolts are secured and/or anchored into the foundation block or slab, generally consisting of concrete or other similar materials.

To provide a more secure engagement between the towers and their respective foundation, the foundation bolts used in mounting these large towers are typically tensioned.

In certain prior art tensioning systems, foundation bolts are tensioned using two or more hydraulic jacks temporarily mounted next to the bolt and coupled thereto by a generally rigid plate mounted to the bolt. The jacks are then actuated and the upward force generated thereby is transmitted to the bolt via the plate. The tension in the bolt is then maintained by threading down the foundation nut until it abuts on the foundation surface.

Even though the aforementioned installation does provide adequate results, it remains cumbersome to handle and prone to accident. Indeed, the installation necessitates at least two hydraulic jacks, a rigid plate and an additional nut which must be properly installed before tensioning each bolt. Hence, the installation is time consuming. Additionally, variability in the installation of the jacks and variability in the forces generated thereby may affect the resulting tension in the bolt and may ultimately damage the rigid plate, the bolt or even both. Finally, since the tensioning installation is seldom perfectly symmetrical, one of the jacks may disengage itself from the rigid plate, resulting in damages to the installation and to the bolt and possibly even injuries to the operator.

Conventional tensioners are also sometimes used to tension foundation bolts. Still, conventional tensioners have problems of their own.

Firstly, conventional tensioners are not particularly adapted to be used on foundation bolts due to the length of the latter. Indeed, to tension a foundation bolt using a conventional tensioner, the tensioner must first be installed and then the reaction nut which transmits the upward force to the bolt must be manually threaded down all the way along the length of the bolt. Understandably, this manual threading is particularly time consuming, the more so when dozens of foundation bolts must be tensioned for each turbine or tower.

Secondly, due to the length of foundation bolts, the latter are prone to being damaged, either by bending the bolt or by damaging the threads thereon. To tension a damaged bolt using a conventional tension can become problematic since it is sometimes difficult or even impossible to thread the reaction nut along the damaged portion of the bolt.

Consequently, using prior art tensioning systems and tensioners to tension foundation bolts is particularly time consuming, prone to accidents and sometimes even impossible. Hence, a need still exists for a novel foundation bolt tensioner which will mitigate the aforementioned and other shortcomings of the prior art.

SUMMARY OF THE INVENTION

The aforesaid and other shortcomings of the prior art are generally mitigated by the novel foundation bolt tensioner about to be described.

The foundation bolt tensioner of the present invention is used to tension foundation bolts used in securing generally large utility towers such as, but not limited to, wind turbines and electric transmission towers. Typically, the foundation bolt tensioner comprises a generally elongated outer body defining a generally cylindrical passage therethrough and configured to slidingly receive a generally annular inner body with which it defines a generally annular piston area. The inner body is further configured to engage a split nut capable of being mounted to the foundation bolt.

More particularly, the outer body is generally, but not exclusively, provided as a cylinder or a prism having a generally cylindrical passage extending along the length thereof through which can extend the foundation bolt. Typically, the outer body defines a lower portion adapted to engage the foundation surface and an upper portion adapted to receive the inner body.

The lower portion of the outer body is typically terminated by a flat lower surface adapted to rest on the foundation surface when the tensioner is installed on the foundation bolt. The lower portion of the outer body and more particularly the portion of the passage extending therealong is further adapted to receive the foundation nut threaded on the foundation bolt. Understandably, the lower portion of the passage is generally sized to provide enough space to thread the foundation nut. Preferably, but not exclusively, the lower portion of the passage is cylindrical in shape.

Typically, the lower portion of the outer body is provided with at least one side opening providing access to the foundation nut when, for instance, the latter needs to be threaded down once the foundation bolt has been tensioned. Understandably, the shape and size of the side opening can vary depending on the size and type of foundation nut and on the type of tools needed to thread the foundation nut.

The upper portion of the outer body is adapted to slidingly receive therein a generally annular inner body. The inner body is also provided with a passage therethrough for receiving the foundation bolt. The lower portion of the inner body defines a generally annular piston area with the upper portion of the outer body, the piston area being in fluid communication with one or more hydraulic fluid inlet ports extending through the outer body.

The upper portion of the inner body is generally configured as a seat for receiving and engaging a split nut mounted to the foundation bolt. Preferably, the seat portion of the inner body is shaped as a countersink in order to provide an adequate engagement between the inner body and the split nut during operation of the tensioner.

As mentioned above, the tensioner is also provided with a split nut typically comprising two half nut sections which can be mounted together on the foundation bolt with known fasteners such as bolts and nuts assemblies. The split nut allows the operator of the tensioner to mount the split nut as near as possible to the tensioner during operation thereof. The split nut transmits the upward force generated by the piston area of the tensioner to the foundation bolt.

Typically, the split nut defines a lower portion and an upper portion. Generally, the upper portion is provided with means such as bolt passage or channel for receiving the bolts and nuts assemblies used to securing both halves of the split nut together. For its part, the lower portion is preferably shaped to be complementary with the shape of the countersink-shaped seat portion of the inner body. In accordance with the present invention, the lower portion is preferably frustro-conically shaped.

In order to assist the operator in threading the foundation nut once the bolt is tensioned, the tensioner of the present invention could advantageously be provided with a threading ring adapted to be mounted to the foundation nut and having, for example, tommy bar holes on its outer periphery.

The tensioner of the present invention is also advantageously provided with means such as spring or springs to automatically retract the inner body once the tensioner is depressurized.

Due to the fact that the foundation bolt tensioner can be relatively heavy, the latter can advantageously be provided with one or more handles generally mounted to the outer body via appropriate brackets.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel foundation bolt tensioner will be described hereinafter. Although the invention is described in terms of specific illustrative embodiments, it is to be understood that the embodiments described herein are by way of example only and that the scope of the invention is not intended to be limited thereby.

Figure 1:
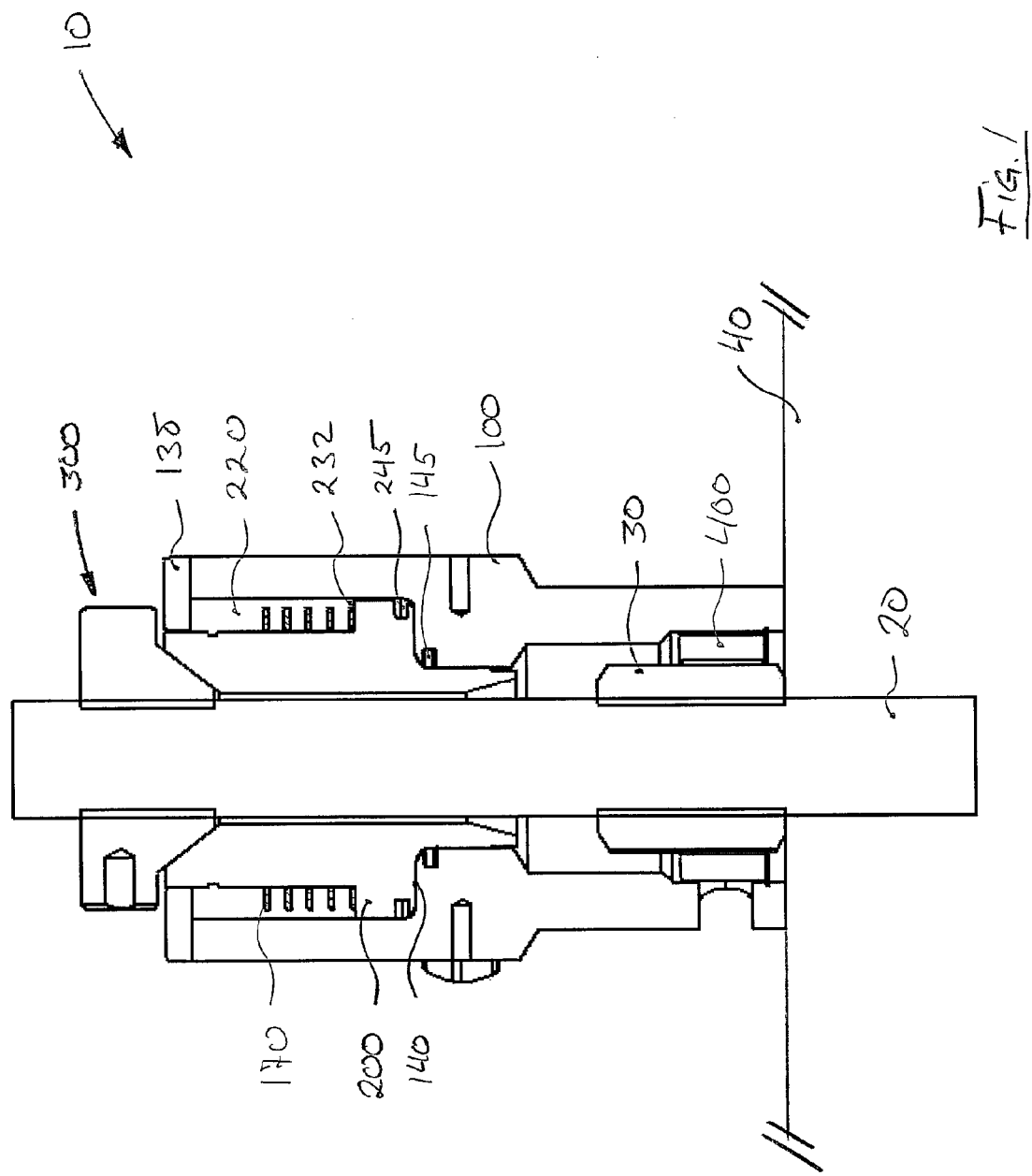
FIG. 1 is a cross-sectional side view of an embodiment of the tensioner of the present invention as mounted on a foundation bolt.

The foundation bolt tensioner 10 of the present invention is mainly used to tension foundation bolts 20 used for securing large utility towers such as, but not limited to, wind turbines and power transmission towers. Referring now to FIG. 1, a typical preferred embodiment of the tensioner 10 comprises a main outer body 100, an inner body 200 generally configured to be slidingly mounted inside the outer body 100 to define therewith an annular pressure area 140, a split nut 300 adapted to be engaged by the inner body 200 during the tensioning procedure and a threading ring 400 adapted to engage the foundation nut 30 and assist the operator in threading it.

Figure 2:
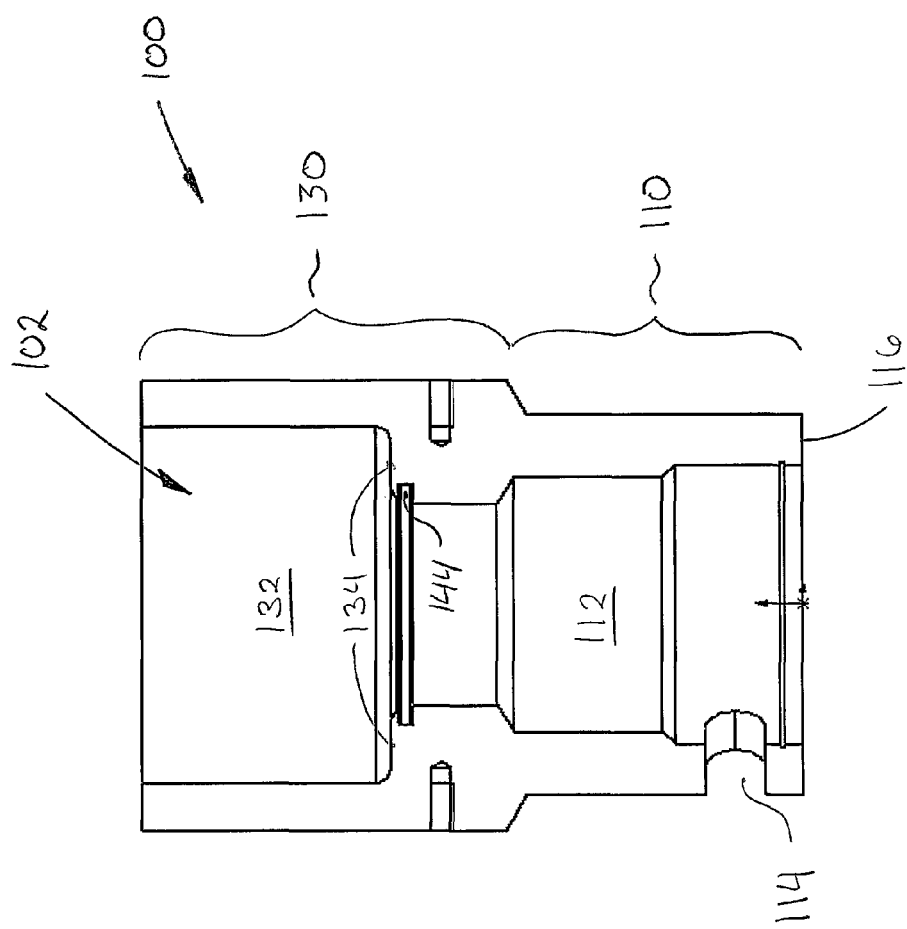
FIG. 2 is a cross-sectional side view of the outer body of the tensioner of FIG. 1.

More particularly, referring to FIG. 2, the outer body 100 of the tensioner 10 defines a passage 102 therethrough for receiving a foundation bolt 20 typically anchored in and extending from a foundation surface 40. The outer body 100 defines a generally lower portion 110 and a generally upper portion 130.

The lower portion 110 is configured to rest and abut on the foundation surface 40 when the tensioner 10 is mounted to the bolt 20. As such, the lower portion 110 is typically terminated by a lower surface 116 which rests on the foundation surface 40. The lower portion 112 of the passage 102 extending through the lower portion 110 is typically made larger than the diameter of the bolt 20 in order to further accommodate the foundation nut 30 mounted to the bolt 20 and the threading ring 400 preferably mounted to the foundation bolt 30. Since the nut 30 is destined to be threaded while the tensioner 10 is mounted to the bolt 20, the diameter of the lower portion 112 of the passage 102 must also be large enough to accommodate a rotating nut 30.

Though the inner surface of the lower portion 112 of the passage 102 is typically cylindrical, the skilled addressee will readily understand that other shapes such as polygonal shapes are also possible; the present invention is therefore not so limited.

In order to provide access to the foundation nut 30 and to the threading ring 400, the lower portion 110 is preferably provided with at least one side opening 114. The side opening 114 is generally configured to allow the insertion of a threading tool such as a tommy bar (not shown) inside the lower portion 112 of the passage 102 to assist the operator of the tensioner 10 to thread the nut 30 with the assistance of the threading ring 400. Accordingly, depending on the type and size of the tool intended to be used, the size and shape of the side opening 114 can vary. In addition, more than one opening 114 could be provided if found practical or necessary; the present invention is not so limited.

The upper portion 130 of the outer body 100 comprises the upper portion 132 of the passage 102 extending through the whole outer body 100. The upper passage 132 is preferably cylindrical and is adapted to slidingly receive the cylindrically shaped inner body 200. As depicted in FIG. 2, the upper portion 132 of the passage 102 defines an annular shoulder 134 which defines the annular pressure area 140 with the corresponding annular shoulder portion 214 of the lower portion 210 of the inner body 200 (see FIG. 3). The pressure area 140 is adapted to be filled with hydraulic fluid during operation of the tensioner 10.

Figure 4:
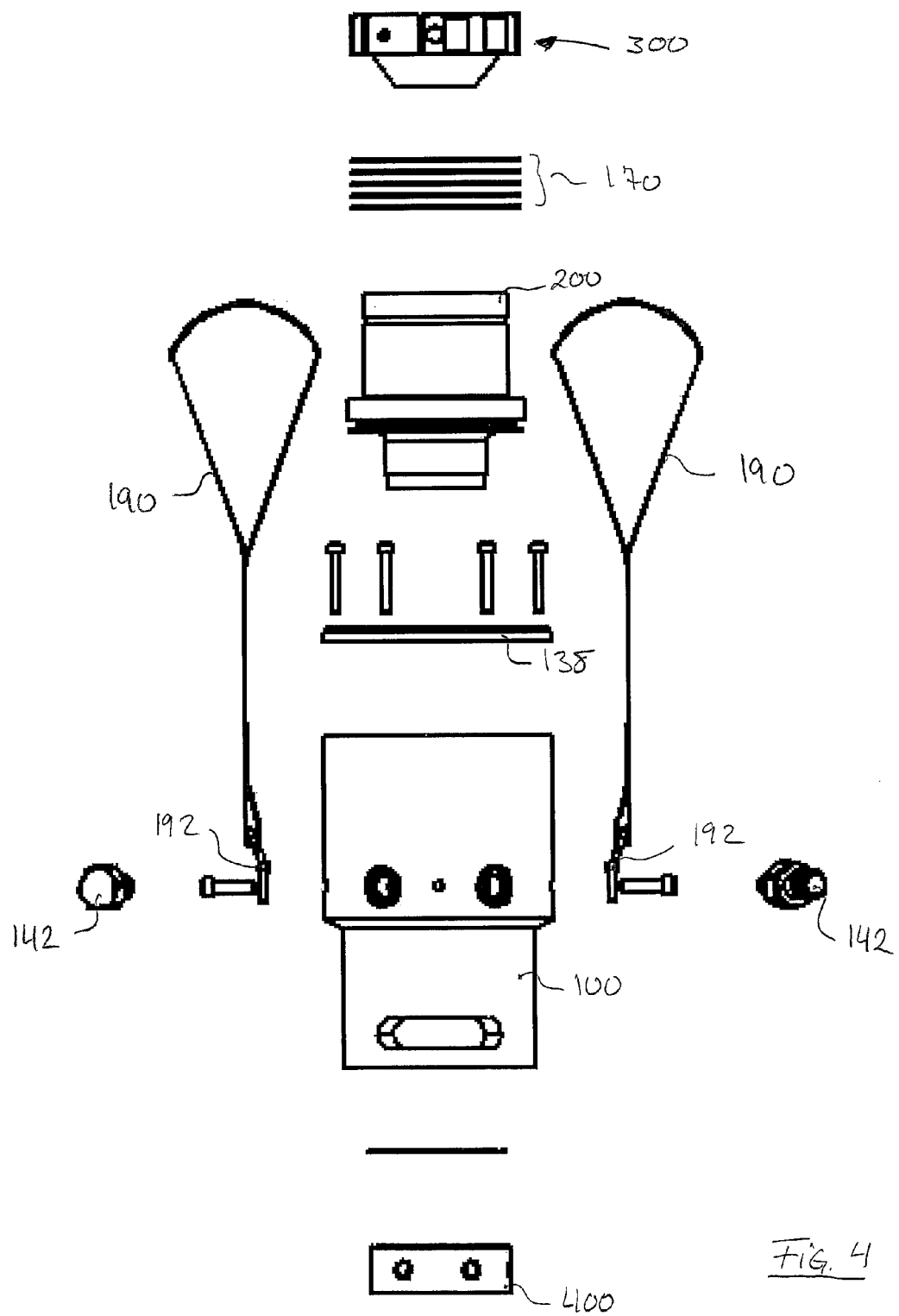
FIG. 4 is an exploded side view of the tensioner of FIG. 1.

In that sense, in order to provide hydraulic fluid to the annular pressure area 140, the upper portion 130 of the main outer body 100 is provided with at least one hydraulic fluid inlet port 142 to which a hydraulic fluid supply hose (not shown) can be connected (see FIG. 4). The inlet port 142 is in fluid communication with the annular pressure area 140. Understandably, more than one inlet port 142 could be provided if found practical or necessary.

In order to adequately seal the pressure area 140 during operation of the tensioner 10, the outer body 100 and the inner body 200 are each preferably respectively provided with circumferential grooves 144 and 244 into which hydraulic seals (not shown) could be disposed.

Figure 3:
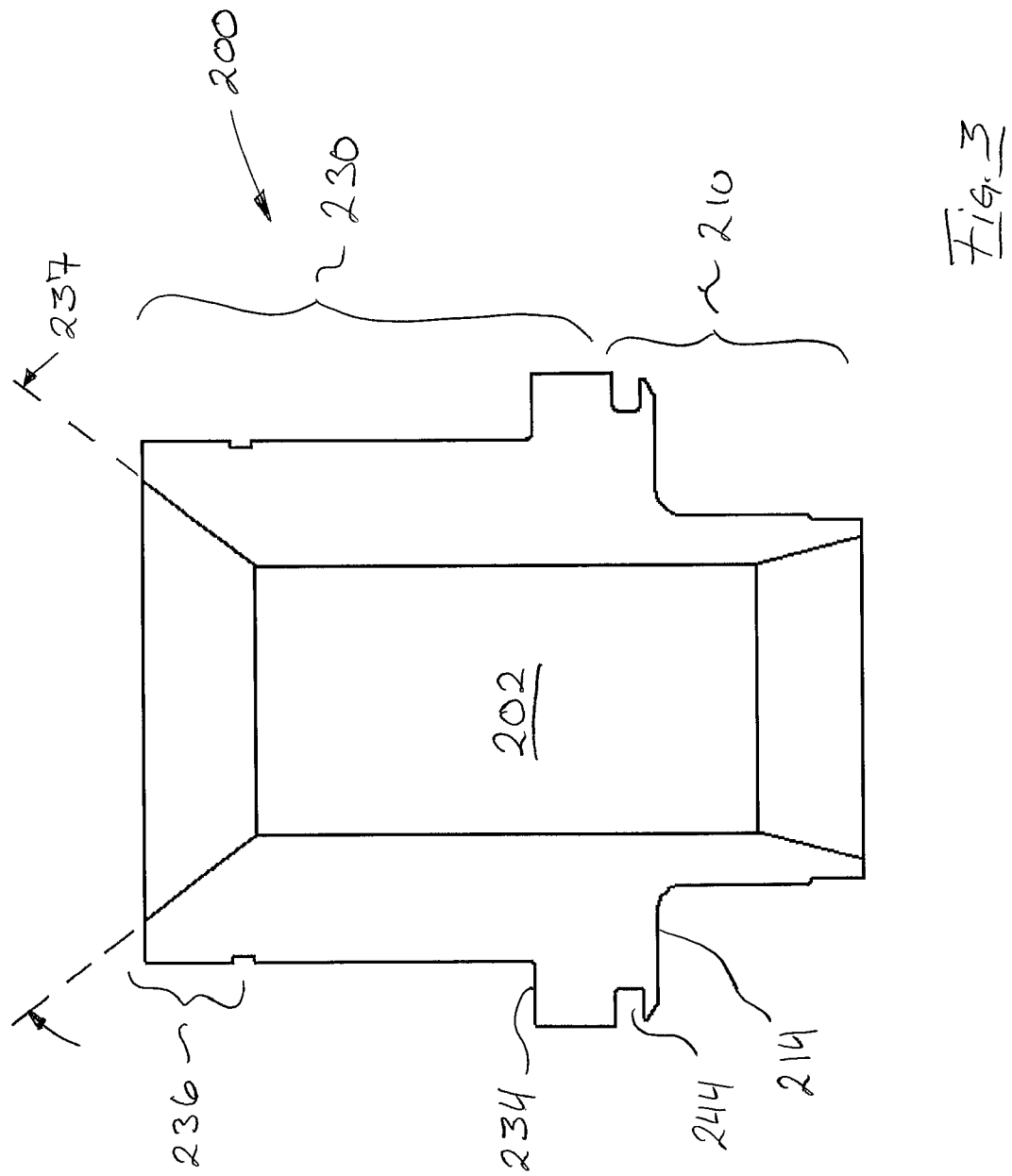
FIG. 3 is a cross-sectional side view of the inner body of the tensioner of FIG. 1.

Referring now to FIG. 3, as for the outer body 100, the inner body 200 is also provided with a passage 202 extending therethrough for receiving the foundation bolt 20. Typically, the inner surface of the passage 202 is smooth and the diameter thereof is slightly larger than the outer diameter of the foundation bolt 20 so that the inner body does not directly engage the bolt 20.

The inner body 200 typically defines a lower portion 210 and an upper portion 230. As mentioned above, the lower portion 210 comprises an annular shoulder portion 214 which cooperates with the shoulder portion 134 of the outer body 100 to define the pressure area 140.

The upper portion 230 of the inner body 200 also comprises an annular shoulder portion 234. The shoulder portion 234 defines, with the upper cap 138 mounted at the upper extremity of the upper portion 130 (see FIGS. 1 and 4), an annular channel 220 into which are mounted resilient means 170 such as spring or springs (best shown in FIG. 1). These resilient means 170 act as a recall or retracting mechanism which automatically pushes down the inner body 200 when the hydraulic fluid is removed from the pressure area 140, resulting in a substantially always ready-to-use tensioner 10.

Referring back to FIG. 3, the upper extremity of the upper portion 230 of the inner body 200 comprises a seat portion 236 which is preferably configured as a countersink. The seat portion 236 is adapted to mate with the split nut 300 about to be described. Though other shape could be used, the preferred countersink shape allows for an automatic alignment of the tensioner 10 and the split nut 300 during operation.

In a preferred embodiment, the angle 237 defined by the countersink shape is smaller than 90°, preferably smaller than 85° and most preferably smaller than 80°. In the present embodiment, the angle 237 is about 75°.

The split nut 300 of the tensioner 10 is separate from the outer body 100 and inner body 200. Still, the split nut 300 forms part of the tensioner 10 as it is the component that ultimately transmits the axially load or force generated by the annular pressure area 140 on the inner body 200 to the foundation bolt 20.

Figure 5:
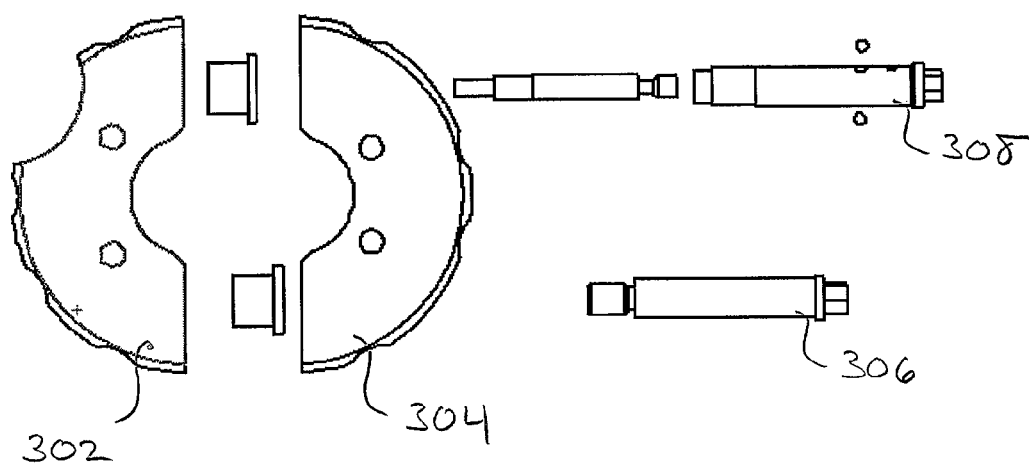
FIG. 5 is an exploded top view of the split nut of the tensioner of the present invention.

As depicted in FIG. 5, the split nut 300 is comprised of preferably two generally semi-circular half nut sections 302 and 304 adapted to be mounted together typically via two fastening assemblies such as, but not limited to, conventional quick-release bolt and nut assemblies 306 and 308. Other means or mechanisms to secure the two half sections together are however possible. The inner surface of each half nut section 302 and 304 is typically semi-circular and provided with threads complementary with the threads of the outer surface of the foundation bolt 20.

Figure 6:
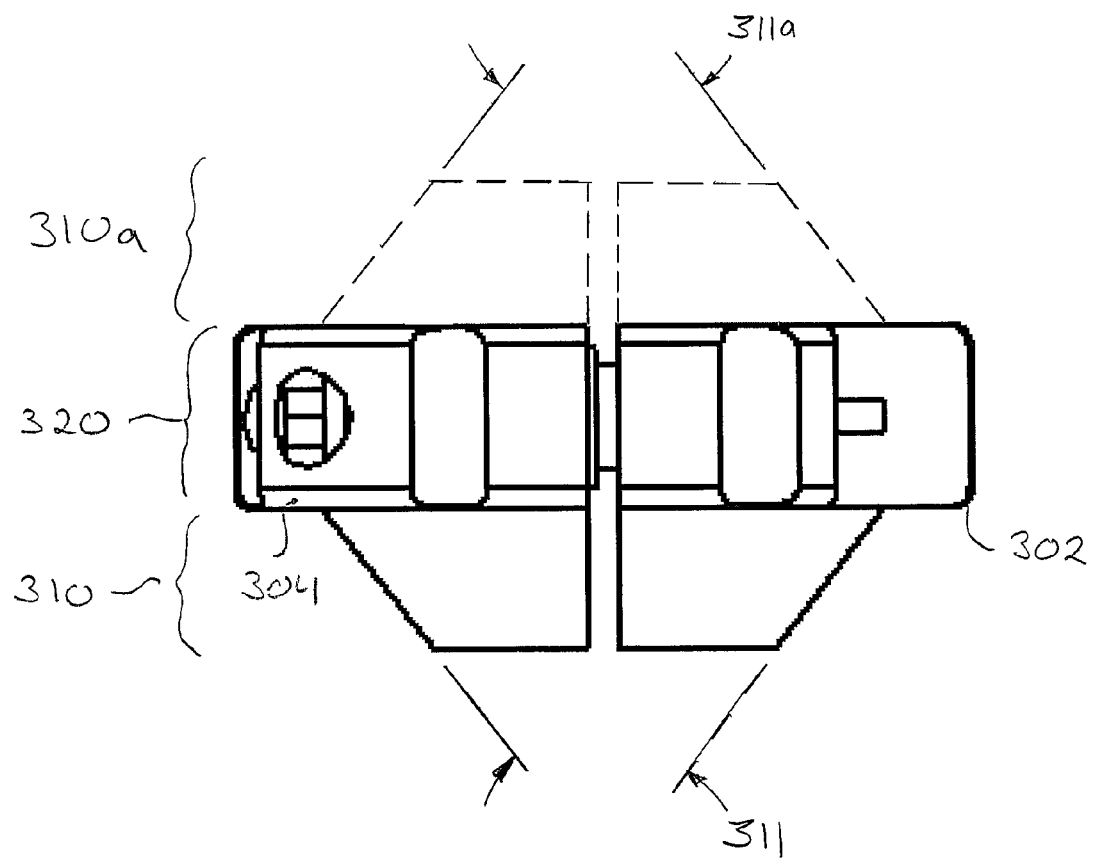
FIG. 6 is a side view of the split nut of the tensioner of the present invention.

As depicted in FIG. 6, once assembled, the split nut 300 generally defines a lower portion 310 and an upper portion 320. The upper portion 320 is generally provided with means such as, but not limited to, bores or channels for receiving the quick-release bolt and nut assemblies 306 and 308 used for securing both halves 302 and 304 together.

For its part, the lower portion 310 is typically tapered and frustro-conical in shape and is substantially complementary with the countersink-shaped seat portion 236 of the inner body 200 in order to provide adequate engagement therebetween. As such, in preferred embodiments of the present invention, the angle 311 defined by the frustro-conically shaped lower portion 310 is smaller than 90°, preferably smaller then 85° and most preferably smaller than 80°. In the present embodiment, the angle 311 is about 75° and substantially corresponds to the angle 237 of the countersink shaped seat portion 236 of the inner body 200.

According to another embodiment, the split nut 300 could comprise a portion 310a (shown in dotted line in FIG. 6) which is a mirror image of the lower portion 310. In accordance with this second embodiment, since both the lower portion 310 and the mirror lower portion 310a are substantially identically shaped, the orientation of the split nut 300 could be switched without affecting the proper functioning of the tensioner 10, thereby providing a reversible split nut 300.

As depicted in FIG. 4, in the preferred embodiment of the tensioner 10, the latter is preferably provided with one or more handles 190 for assisting the operator in displacing the tensioner 10. Though shown as being mountable to the outer body 100 with brackets 192, the handles 190 could be mounted elsewhere or could be unitary with the outer body 100; the present invention is not so limited.

In operation, the threading ring 400 is preferably first mounted to a foundation nut 30 mounted to a foundation bolt 20 of a tower. Then, the tensioner 10 is slid along the foundation bolt 20 until the lower face 116 abuts on the foundation surface 40. At this point, the operator usually does not have to manually retract the inner body 200 since the inner body 200 should already be retracted due to the action of the spring 170. The split nut 300 is then assembled and mounted to the foundation bolt 20. Preferably, the split nut 300 is assembled as close as possible to the seat portion 236 of the inner body 200 in order to minimize the threading of the split nut 300 along the foundation bolt 20. Once assembled, the split nut 300 is threaded down until its lower portion 310 (or the mirror lower portion 310a) abuts in the seat portion 236 of the inner body 200.

At this point, the tensioner 10 is ready to be pressurized. To do so, a hydraulic fluid source hose (not shown) is connected to the hydraulic fluid inlet port 142 of the outer body 100. Hydraulic fluid is then introduced in the annular pressure area 140. During pressurization, the hydraulic fluid introduced in the annular pressure area 140 generates pressure which urges the inner body 200 upwardly. The upward movement of the inner body 200 is transmitted to the foundation bolt 20 via the split nut 300 threaded to the bolt 20 and resting in the seat portion 236. The upward movement transmitted to the foundation bolt 20 then creates an axial load therein and effectively tensions the bolt 20.

Once the foundation bolt 20 is adequately tensioned, the foundation nut 30, which is preferably already threaded down near the foundation surface 40, is further threaded down, typically using a tommy bar and the threading ring 400, until it effectively abuts on the foundation surface 40. The tension provided to the foundation bolt 20 is then retained by the foundation nut 30.

At this point, the tensioner 10 can be depressurized and the split nut 300 can be disassembled and removed from the foundation bolt 20. The tensioner 10 can then be removed from the foundation bolt 20 and be used on another foundation bolt 20.

The skilled addressee will note that the countersink-frustro-conical engagement between the inner body 200 and the split nut 300 provides at least two important features. Firstly, the countersink-frustro-conical engagement provides for a substantially automatic alignment of the tensioner 10 with the split nut 300 if, for instance, the foundation surface 40, on which the tensioner 10 is disposed, is not perfectly flat. This may prevent damages to the bolt 20 and/or to the split nut 300. Secondly, the countersink-frustro-conical engagement acts as a safety feature should the operator fail to properly secure both halves 302 and 304 of the split nut 300 together. Indeed, by using a countersink-frustro-conical engagement, the force effectively transmitted to the split nut 300 comprises a radial component which urges both halves 302 and 304 of the split nut 300 toward each other and ultimately closes the split nut 300 around the bolt 20, thereby preventing damages to the bolt 20 and/or to the split nut 300 due to improper engagement between the threads of the split nut 300 and the threads of the bolt 20.

By using an automatic inner body retracting mechanism (e.g. spring 170) and a split nut 300, the present invention provides for a more time efficient operation of the tensioner 10 since the inner body 200 is systematically automatically retracted to a ready-to-use position between uses and the split nut 300 can be assembled as close as possible to the seat portion 236 of the of the inner body 200, thereby saving the time it would normally require to thread down a regular unitary nut along the length of the foundation bolt 20 extending above the tensioner 10. It is to be understood that large utility towers can comprise dozens of foundation bolts and reducing the time required to tension each and every bolt is highly desired.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A hydraulic tensioner for tensioning a foundation bolt, said bolt having a bolt diameter, said tensioner comprising:
   a) an outer body having a lower portion and an upper portion, said outer body defining an internal passage and comprising an internal annular shoulder, said outer body comprising an upper annular cap removably mounted at an extremity of said upper portion;
   b) an inner body slidingly received into said upper portion of said outer body, said inner body defining an internal passage suitably sized and shaped to allow said foundation bolt to extend therethrough, said internal passage being larger than said bolt diameter, said inner body comprising an external annular shoulder configured to define an annular pressure area with said internal annular shoulder of said outer body, said annular pressure area being configured to receive therein hydraulic fluid, said external annular shoulder defining an annular channel with said upper annular cap;
   c) at least one resilient element mounted in said annular channel and extending between said annular upper cap and said external annular shoulder, said at least one resilient element being configured to urge said inner body toward said internal annular shoulder;
   d) a hydraulic fluid inlet port mounted to said outer body and fluidly communicating with said pressure area;
   e) a split nut configured to be mounted to said foundation bolt, said split nut being configured to be engaged by said inner body;
   whereby when said tensioner is mounted to said foundation bolt, introduction of hydraulic fluid into said annular pressure area urges said inner body and said split nut upwardly, thereby tensioning said foundation bolt.

2. A tensioner as claimed in claim 1, wherein said inner body comprises an upper extremity, said upper extremity of said inner body being substantially configured as a countersink.

3. A tensioner as claimed in claim 2, wherein said split nut comprises a first portion and a second portion extending from said first portion, said second portion of said split nut being substantially configured as a frustro-cone substantially matching said countersink configuration of said upper extremity of said inner body.

4. A tensioner as claimed in claim 3, wherein said countersink defines a first angle and said frustro-cone defines a second angle, and wherein said first and second angles are substantially matching.

5. A tensioner as claimed in claim 3, wherein said countersink defines a first angle and said frustro-cone defines a second angle, and wherein said first and second angles are smaller than 90°.

6. A tensioner as claimed in claim 3, wherein said countersink defines a first angle and said frustro-cone defines a second angle, and wherein said first and second angles are smaller than 85°.

7. A tensioner as claimed in claim 3, wherein said countersink defines a first angle and said frustro-cone defines a second angle, and wherein said first and second angles are smaller than 80°.

8. A tensioner as claimed in claim 3, wherein said countersink defines a first angle and said frustro-cone defines a second angle, and wherein said first and second angles are approximately 75°.

9. A tensioner as claimed in claim 2, wherein said split nut comprises a first portion, a second portion extending from said first portion, and a third portion extending from said first portion opposite said second portion, both of said second and third portions being substantially configured as frustro-cones substantially matching said countersink configuration of said upper extremity of said inner body.

10. A tensioner as claimed in claim 1, wherein said inner body comprises an upper extremity, said upper extremity of said inner body having a first configuration.

11. A tensioner as claimed in claim 10, wherein said split nut comprises a first portion and a second portion extending from said first portion, said second portion having a second configuration substantially complementary to said first configuration of said upper extremity of said inner body such that said second portion can be engaged by said upper extremity of said inner body.

12. A tensioner as claimed in claim 10, wherein said split nut comprises a first portion, a second portion extending from said first portion, and a third portion extending from said first portion opposite said second portion, said second portion having a second configuration and said third portion having a third configuration substantially identical to said second configuration, said second and third configurations being substantially complementary to said first configuration of said upper extremity of said inner body such that either one of said second and third portions of said split nut can be engaged by said upper extremity of said inner body.

13. A tensioner as claimed in claim 1, wherein said at least one resilient element comprises at least one spring.

14. A tensioner as claimed in claim 1, wherein said at least one resilient element comprises several springs.

15. A tensioner as claimed in claim 1, wherein said inner body comprises an upper extremity, said upper extremity of said inner body being configured as a seat, wherein said split nut comprises a first portion and a second portion extending from said first portion, said second portion of said split nut being configured to match a configuration of said seat.

16. A hydraulic tensioner for tensioning a bolt, said bolt having a bolt diameter, said tensioner comprising:
   a) an outer body having a lower portion and an upper portion, said outer body defining an internal passage and comprising an internal annular shoulder, said outer body comprising an upper annular cap removably mounted at an extremity of said upper portion;
   b) an inner body slidingly received into said upper portion of said outer body, said inner body defining an internal passage suitably sized and shaped to allow said bolt to extend therethrough, said internal passage being larger than said bolt diameter, said inner body comprising an upper extremity having a first configuration, said inner body comprising an external annular shoulder configured to define an annular pressure area with said internal annular shoulder of said outer body, said annular pressure area being configured to receive therein hydraulic fluid, said external annular shoulder defining an annular channel with said upper annular cap;
c) at least one resilient element mounted in said annular channel and extending between said annular upper cap and said external annular shoulder, said at least one resilient element being configured to urge said inner body toward said internal annular shoulder;
d) a hydraulic fluid inlet port mounted to said outer body and fluidly communicating with said pressure area;
e) a split nut configured to be mounted to said bolt, said split nut comprising a first portion, a second portion extending from said first portion, and a third portion extending from said first portion opposite said second portion, said second portion having a second configuration and said third portion having a third configuration substantially identical to said second configuration, said second and third configurations being substantially complementary to said first configuration of said upper extremity of said inner body such that said either one of said second and third portions of said split nut can be engaged by said upper extremity of said inner body;

whereby when said tensioner is mounted to said bolt, introduction of hydraulic fluid into said annular pressure area urges said inner body and said split nut upwardly, thereby tensioning said bolt.

17. A hydraulic tensioner as claimed in claim 16, wherein said first configuration is a countersink configuration, and wherein said second and third configurations are frustro-cone configurations.

18. A method for tensioning a foundation bolt anchored into a foundation and having threaded thereto a foundation nut, using a hydraulic tensioner as claimed in claim 1, said method comprising:
lowering said tensioner along said foundation bolt until said tensioner rests on said foundation;
mounting said split nut to said foundation bolt near said inner body;
threading said split nut along said foundation bolt until said split nut abuts on said inner body;
injecting hydraulic fluid into said annular pressure area via said hydraulic fluid inlet, said hydraulic fluid urging said inner body and said split nut upwardly, thereby tensioning said foundation bolt;
threading said foundation nut until said foundation nut abuts on said foundation.

19. A method as claimed in claim 18, further comprising:
removing said hydraulic fluid from said annular pressure area via said hydraulic fluid inlet.

* * * * *